United States Patent [19]

Ault et al.

[11] Patent Number: 5,781,543
[45] Date of Patent: Jul. 14, 1998

[54] POWER-EFFICIENT ACQUISITION OF A CDMA PILOT SIGNAL

[75] Inventors: Jan C. Ault, Santee; Robbin D. Hughes, San Diego, both of Calif.

[73] Assignee: QUALCOMM Incorporated, San Diego, Calif.

[21] Appl. No.: 705,465

[22] Filed: Aug. 29, 1996

[51] Int. Cl.⁶ .................................................. H04J 13/02
[52] U.S. Cl. ........................ 370/342; 370/441; 375/205
[58] Field of Search ................................. 370/310, 311, 370/320, 318, 330, 331, 332, 333, 335, 337, 342, 341, 479; 375/200, 205, 208, 209, 210; 455/422, 436, 442, 38.1, 38.3, 517, 522, 524, 525

[56] References Cited

U.S. PATENT DOCUMENTS

| | | | |
|---|---|---|---|
| 5,167,024 | 11/1992 | Smith et al. | 395/375 |
| 5,203,020 | 4/1993 | Sato et al. | 455/68 |
| 5,363,430 | 11/1994 | Yamagata et al. | 379/61 |
| 5,566,357 | 10/1996 | Holcman | 455/54.1 |
| 5,566,366 | 10/1996 | Russo et al. | 455/343 |
| 5,590,396 | 12/1996 | Henry | 455/33.1 |
| 5,644,591 | 7/1997 | Sutton | 370/342 |
| 5,694,388 | 12/1997 | Sawashashi et al. | 370/342 |
| 5,696,789 | 12/1997 | Jones et al. | 370/342 |

*Primary Examiner*—Dang Ton
*Attorney, Agent, or Firm*—Russell B. Miller; Roger W. Martin

[57] ABSTRACT

A system and method for acquiring a code division multiple access (CDMA) pilot signal having a pilot pseudonoise (PN) code offset in a CDMA communication system. A received signal is correlated with a first set of PN code offset hypotheses. If this first "full" search is unsuccessful in acquiring the CDMA pilot signal, the method includes waiting for a first period, and then correlating the received signal with a second set of PN code offset hypotheses which are a subset of said first set of PN code offset hypotheses and therefore requires less search time. If this "mini" search is unsuccessful in acquiring the CDMA pilot signal the method includes waiting for a second period and then quickly measuring the energy of the received signal. If the received energy exceeds a threshold, then a "mini" search is immediately performed. These alternating search techniques of full, mini, micro are repeated.

6 Claims, 3 Drawing Sheets

POWER-EFFICIENT ACQUISITION OF A CDMA PILOT SIGNAL

BACKGROUND OF THE INVENTION

I. Field of the Invention

The present invention relates to wireless communication systems. More particularly, the present invention relates to a novel and improved system and method for acquiring a code-division multiple access (CDMA) pilot signal in a wireless communication device.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. Additionally, there are analog frequency modulation (FM) based wireless communication systems such as the Advanced Mobile Phone System (AMPS). Wireless communication devices exist which are capable of operating in multiple modes, such as CDMA and AMPS, or on CDMA systems of different frequency bands (i.e. cellular and Personal Communication Services (PCS) frequencies).

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or mobile telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in U.S. patent application Ser. No. 08/509,721, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

It happens that the acquisition procedure will not always result in the acquisition of a pilot channel. For example, the wireless communication device might be located temporarily in a tunnel or other geographic area characterized by weak microwave propagation. Nevertheless, when an attempt at acquisition fails, the wireless communication device typically will immediately repeat the acquisition procedure until it acquires a pilot channel.

In a typical wireless communication coverage area, there may be two or more CDMA channels. Since a typical full duration pilot channel search may take about fifteen seconds per channel, it is easy to appreciate that a mobile telephone can consume a considerable amount of energy in repeated full acquisition procedures. As further recognized herein, existing wireless communication devices will nonetheless continue to repeat the acquisition procedure until a pilot channel is acquired, despite the fact that the conditions that inhibited acquisition in the first place, e.g., poor reception caused by geographic location, might not have changed. As stated above, such repeated futile attempts at reacquisition can consume power and consequently undesirably drain the battery of the wireless communication device.

Furthermore, in a dual-mode communication device, adequate communication service may be available in the non-preferred mode of the two modes. For example, a dual-mode CDMA/AMPS may be traveling through a geographical area which has good AMPS coverage, but poor CDMA coverage. If the CDMA mode is the preferred mode of operation, then the communication device will typically scan for CDMA service at regular intervals. However, since there is typically only one transceiver in a dual-mode communication device, tuning to the anticipated pilot frequency of the CDMA system means ignoring any potential incoming messages (i.e. pages) from the AMPS system. If there is no CDMA pilot signal available, then the communication device could potentially miss an incoming page on the AMPS system while it spent time futilely searching for the CDMA pilot signal.

Accordingly, it is an object of the present invention to provide a system and method for repeatedly attempting to acquire a pilot channel in a CDMA communication system. Another object of the present invention is to provide a system and method for repeatedly attempting to acquire a pilot channel in a CDMA communication system, while conserving power. Still another object of the present invention is to provide a system and method for repeatedly attempting to acquire a pilot channel in a CDMA communication system while maintaining reliable communication in a secondary communication system.

SUMMARY OF THE INVENTION

The present invention is a novel and improved system and method for acquiring a code division multiple access (CDMA) pilot signal having a pilot pseudonoise (PN) code offset in a CDMA communication system. The method of the present invention includes correlating a received signal with a first set of PN code offset hypotheses to produce a first set of correlation metrics. This first set of correlation metrics is analyzed to determine whether one of the first set of PN code offset hypotheses matches the pilot PN code offset.

If this first "full" search is unsuccessful in acquiring the CDMA pilot signal (i.e. if none of the first set of PN code offset hypotheses matches the pilot PN code offset), the method includes waiting for a first period, and then correlating the received signal with a second set of PN code offset hypotheses to produce a second set of correlation metrics. The second set of PN code offset hypotheses is a subset of said first set of PN code offset hypotheses and therefore requires less search time. The second set of correlation metrics is then analyzed to determine whether one of the second set of PN code offset hypotheses matches the pilot PN code offset.

If this "mini" search is unsuccessful in acquiring the CDMA pilot signal (i.e. if none of the second set of PN code offset hypotheses matches the pilot PN code offset), the method includes waiting for a second period and then measuring the energy of the received signal to produce a received energy metric. Measuring the energy of the received signal requires much less time than either the "mini" or the "full" searches. The received energy metric is then compared to a received energy threshold. If the received energy metric determined in this "micro" search exceeds said received energy threshold, then a "mini" search is immediately performed.

These alternating search techniques of full, mini, and micro are repeated in a predetermined pattern in order to maximize the probability of acquiring the CDMA pilot channel while minimizing the power consumed, and enabling the communication device to continue to maintain reliable reception of a secondary communication signal. A maximum number of iterations may be defined to tailor the present invention to many different applications.

Additionally, a system is disclosed which implements the method of the present invention as described herein. The system includes a demodulator for demodulating the received signal with the various sets of PN code offset hypotheses to produce the various sets of correlation metrics, a threshold comparer for analyzing the various sets of correlation metrics to determine whether one of said various sets of PN code offset hypotheses matches said pilot PN code offset, and a clock for measuring the waiting time periods. Additionally, the system includes a power detector for measuring the energy of the received signal to produce the received energy metric, and for comparing said received energy metric to the received energy threshold.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
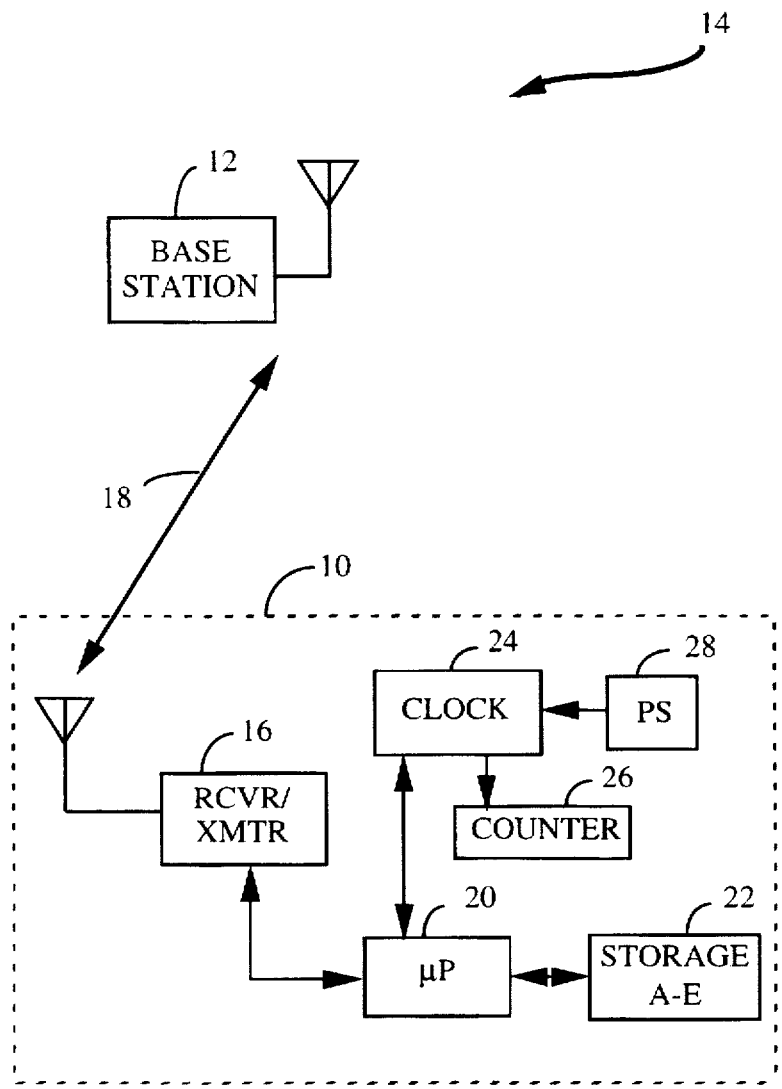
FIG. 1 is logical block diagram of a wireless communication device in communication with a base station in accordance with the present invention.

Referring initially to FIG. 1, a mobile telephone 10 is shown in wireless communication with a base station 12 of a mobile telephone system, generally designated 14. It is to be understood that although a single base station 12 and single mobile telephone 10 are shown in FIG. 1 for clarity of disclosure, the telephone system 14 would typically include other mobile telephones and base stations (not shown). Also, it is understood that other types of wireless communication devices such as cellular telephones, Personal Communication Services (PCS) telephones, and the like are equally applicable to the present invention. However for clarity and simplicity, the present invention will be disclosed with reference to a mobile telephone 10.

In the presently preferred embodiment, the telephone system 14 implements code division multiple access (CDMA) principles to discriminate one mobile telephone signal from another. Details of a preferred CDMA system are set forth in the above referenced U.S. Pat. No. 4,901,307. However, it is understood that telephone system 14 may co-exist in the same geographical area with a separate non-CDMA telephone system (not shown), such as an AMPS system.

As shown in FIG. 1, the mobile telephone 10 includes a receiver/transmitter 16 that can communicate with the base station 12 via a wireless link 18. Further, the mobile telephone 10 includes control circuitry for controlling the reception and transmission of data by the receiver/transmitter 16. In FIG. 1, this control circuitry is rendered, for simplicity, as a digital microprocessor 20. As also shown, the microprocessor 20 can access a data storage device 22. As more fully disclosed below, the data storage device 22 contains instructions that are executable by the microprocessor 20 for undertaking the present invention. Accordingly, with the exception of the logical structure of the data storage device 22, the mobile telephone 10 preferably is a CDMA mobile telephone as is known in the art. It should be noted, however, that mobile telephone 10 may also be a dual-mode telephone, such as a dual mode CDMA/AMPS telephone.

Additionally, the mobile telephone 10 includes an internal clock 24. In the presently preferred embodiment, the internal clock 24 is a voltage controlled temperature controlled crystal oscillator (VCTCXO). However, it should be noted that other clock devices, whether or not crystal-based, are equally suitable for use with the present invention. Accordingly, the output signal of the clock 24 is a sequence of clocking pulses that are sent to a counter 26, with the rate of clocking pulse output being controlled by controlling the voltage of an input signal to the clock 24 from a clock power supply 28 in accordance with well-known principles.

In a spread spectrum communication system such as that shown in FIG. 1, a pilot signal is used to synchronize a mobile station in phase and frequency to the transmissions of a base station. In the exemplary embodiment, the spread spectrum communication system is a direct-sequence spread spectrum communication system. Examples of such systems are discussed in U.S. Pat. No. 5,056,109 and U.S. Pat. No.

5,103,459. In a direct-sequence spread spectrum communication system, the transmitted signals are spread over a frequency band greater than the minimum bandwidth necessary to transmit the information by modulating a carrier wave by the data signal, then modulating the resulting signal again with a wideband spreading signal. In a pilot signal, the data can be looked at as an all ones sequence.

The spreading signal is typically generated by a linear feedback shift register, the implementation of which is described in detail in the aforementioned patents. The spreading signal can be viewed as a rotating phasor of the form:

$$s(t) = Ae^{-j\omega t + \phi} \tag{1}$$

In order to acquire, the mobile station must synchronize to the received signals from the base station in both phase, $\phi$, and in frequency, $\omega$. The object of the searcher operation is to find the phase of the received signal, $\phi$. After finding the phase of the spreading signal, $\phi$, the frequency is found in using a demodulation element that has hardware for both phase and frequency tracking. The method by which a mobile finds the phase of the received signal is by testing a set of phase hypotheses, referred to as a window and determining if one of the hypothetical phase hypotheses, also referred to as offset hypotheses, is correct. An example of a searcher receiver operating with "window" style searches is given in copending U.S. patent application Ser. No. 08/509,721, entitled "METHOD AND APPARATUS FOR PERFORMING SEARCH ACQUISITION IN A CDMA COMMUNICATION SYSTEM", assigned to the assignee of the present invention and incorporated herein by reference.

Figure 2:
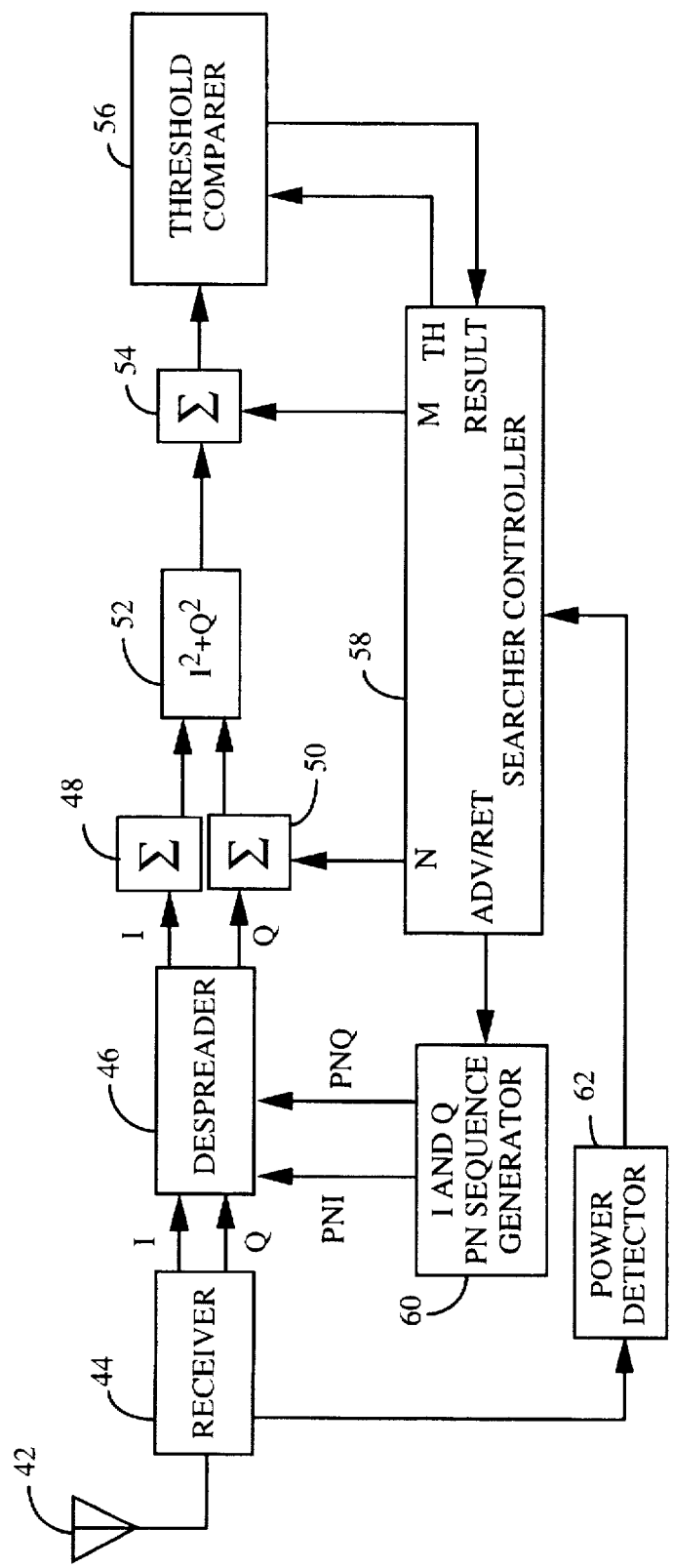
FIG. 2 is a logical block diagram of the correlator apparatus of the present invention.

Referring now to FIG. 2, a description of the correlator apparatus of the receiver/transmitter 16 will be given. Upon power up, a spread spectrum signal is received at antenna 42. The objective of the apparatus shown in FIG. 2 is to gain synchronization between PN sequences generated by PN sequence generator 60 and the received spread spectrum signal which is spread by identical PN sequences of unknown phase.

In the exemplary embodiment, both the means at the base station (not shown) that spreads the pilot signal and PN generator 60 are a maximal length shift register which generate the PN code sequences for spreading and despreading the pilot signal respectively. Thus, the operation of obtaining synchronization between the codes used to despread the received pilot signal and the PN spreading code of the received pilot signal involves determining the time offset of the shift register.

The spread spectrum signal is provided by antenna 42 to receiver 44. Receiver 44 downconverts the signal and provides the signal to despreading element 46. Despreading element 46 multiplies the received signal by the PN code generated by PN generator 60. Due to the random noise-like nature of the PN codes the product of the PN code and the received signal should be essentially zero except at the point of synchronization.

Searcher controller 58 provides an offset hypothesis to PN generator 60. In the exemplary embodiment, the received signal is modulated by quadrature phase shift keying (QPSK), so PN generator provides a PN sequence for the I modulation component and a separate sequence for the Q modulation component to despreading element 46. Despreading element 46 multiplies the PN sequence by its corresponding modulation component and provides the two output component products to coherent accumulators 48 and 50.

Coherent accumulators 48 and 50 sum the product over the length of the product sequence. This product sequence may be of an arbitrary length of PN chips referred to as a "search window" which is defined by a PN offset hypothesis (i.e. the start point of the search) and a search duration (i.e. a "width" of the search window). Coherent accumulators 48 and 50 are responsive to signals from searcher controller 58 for resetting, latching and setting the summation period. The sums of the products are provided from summers 48 and 50 to squaring means 52. Squaring means 52 squares each of the sums and adds the squares together.

The sum of the squares is provided by squaring means 52 to non-coherent combiner 54. Noncoherent combiner 54 determines an energy value from the output of squaring means 52. Noncoherent accumulator 54 serves to counteract the effects of a frequency discrepancy between the base station transmit clocks and the mobile station receive clock and aids in the detection statistic in a fading environment. If one knows that the frequency of the two clocks is exactly the same and that there are no deep fades then the ideal approach is to integrate the sequence over the entire accumulation period in the form:

$$E = \left( \sum_{n=1}^{N} I(n)PNI(n) \right)^2 + \left( \sum_{n=1}^{N} Q(n)PNQ(n) \right)^2 \tag{2}$$

where PNI(n) and PNQ(n) can be ±1.

If, however, there is a probability of frequency mismatch or fading, then the correlator sacrifices some of its detection statistic in order to have a more robust correlation technique of the form:

$$E = \sum_{k=1}^{M} \left\{ \left( \sum_{n=1}^{N} I(n + (k-1)N) \cdot PNI(n + (k-1)N) \right)^2 + \left( \sum_{n=1}^{N} Q(n + (k-1)N) \cdot PNQ(n + (k-1)N) \right)^2 \right\}. \tag{3}$$

Searcher controller 58 provides the value M to noncoherent accumulator 54.

Noncoherent accumulator 54 provides the energy signal to threshold comparer 56. Threshold comparer 56 compares the energy value to predetermined thresholds supplied by searcher controller means 58. The results of each of the comparisons is then fed back to searcher controller 58. Search controller 58 examines the comparisons and determines whether the window contains likely candidates for the correct offset.

In a conventional "full" acquisition search used for scanning windows of a fixed number of hypotheses, the operation described in relation to FIG. 2 is performed to give comparison results. The conventional full search comprises four stages. In a first stage, if a given window is "swept" and no hypothesis' energy exceeds the detection threshold, then searcher controller 58 would begin sweeping the next window as determined by a searching algorithm.

However, if there are points on the calculated energy curve which do exceed the detection threshold, then the apparatus of FIG. 2 proceeds to a validation phase. In the validation phase, the same window is swept again, and this time the calculated energy is compared against a lower threshold value validation threshold. If the maximum energy detected does not exceed the threshold, then a next window is swept.

This process continues with each new window until either a pilot signal is acquired, or all possible windows have been tested. After searching all possible windows, a second stage search would being using a new window size, number of coherent accumulations, and thresholds. Assuming that the second stage search did not result in successful acquisition of a pilot signal, then third and fourth stages are attempted, each with a new window size, number of coherent accumulations, and thresholds.

If however, the maximum energy detected does exceed the lower threshold, the searcher controller 58 would re-sweep the same window N times to validate the detection. After N consecutive successful validation tests then the pilot is determined to be acquired. Thus, due to the size of the search windows, the number of validation sweeps, and the number of search stages, the "full" acquisition search may take about fifteen seconds per CDMA pilot channel. During this full search, the mobile telephone 10 (FIG. 1) is using a significant amount of power. Furthermore, mobile telephone 10 is also prohibited from receiving incoming messages or pages on other frequencies during this full search because it is limited by the single receiver/transmitter 16. The present invention overcomes these limitations by performing reduced searches at regular intervals rather than repeatedly performing full searches.

Figure 3:
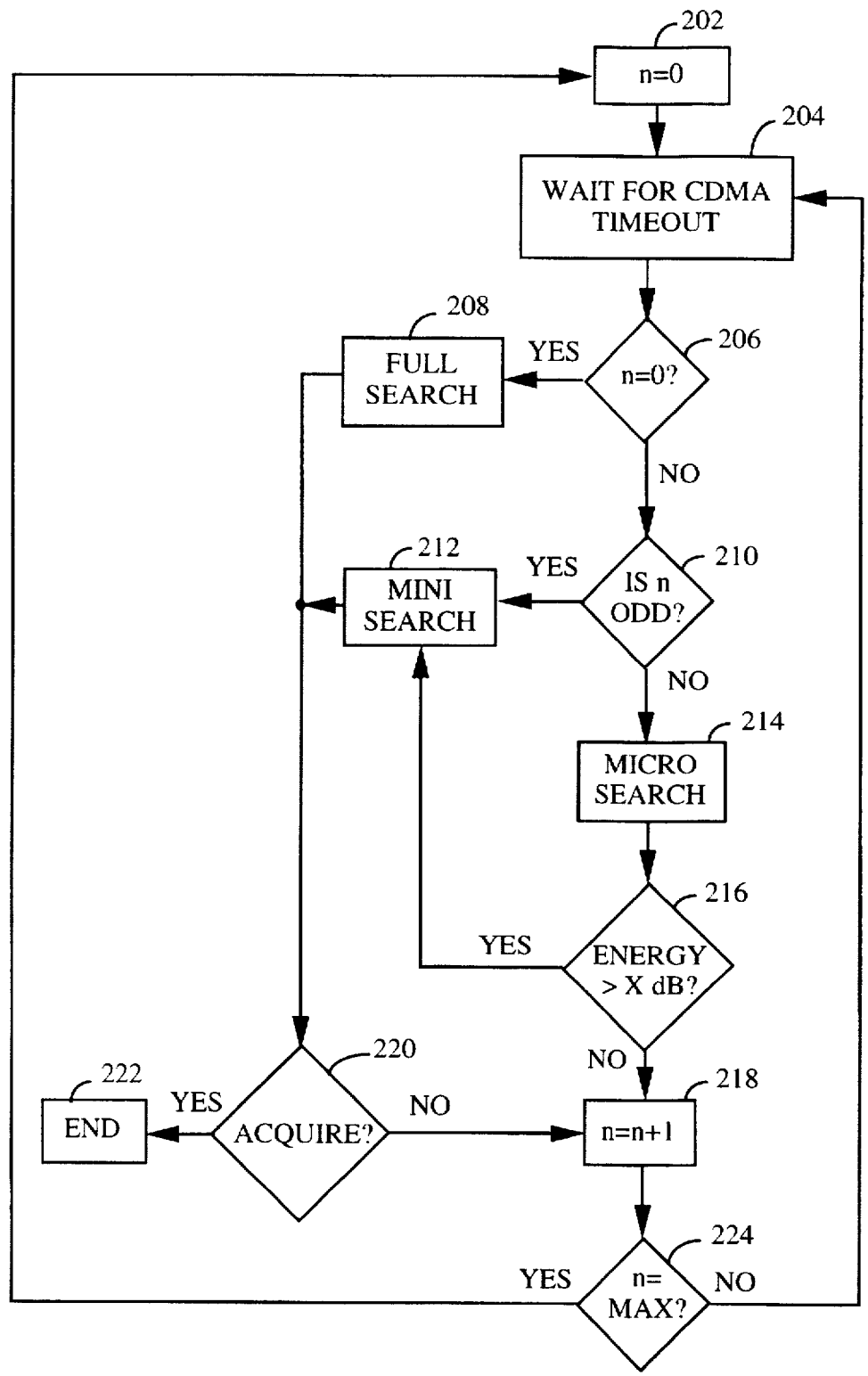
FIG. 3 is a flowchart of the method of a preferred embodiment of the method of the present invention.

FIG. 3 illustrates the structure of the logic of the present invention as embodied in computer-readable logic structures on the storage device 22 (FIG. 1). Those skilled in the art will appreciate that the Figures illustrate the structures of the logic elements that function according to this invention. Manifestly, the invention is practiced in one essential embodiment by a machine component that renders the logic elements in a form that instructs a digital processing apparatus (that is, a computer or microprocessor) to perform a sequence of operational steps corresponding to those shown in the Figures.

These instructions may reside in, i.e., be embodied by, logic structures/circuits on a data storage device including a data storage medium, such as the storage device 22 shown in FIG. 1. The machine component is shown in FIG. 1 as a combination of logic elements A–E that are embodied in the storage device 22, which advantageously can be electronic read-only memory (ROM) or electronic random access memory (RAM), or other appropriate data storage device. Alternatively, the instructions can be embodied in the form of computer program code elements on semiconductor devices, on magnetic tape, on optical disks, on a DASD array, on magnetic tape, on a conventional hard disk drive, on electronic read-only memory or on electronic random access memory, or other appropriate data storage device.

Now referring to FIG. 3, the logic of the present invention can be understood. Starting at block 202, a dummy variable, n, is initialized to zero. At block 204, the system waits for a CDMA "timeout". This CDMA timeout is a time period measured by the internal clock 24 which may be of a fixed or variable duration depending on the operational mode that the mobile telephone 10 is in when attempting acquisition of the CDMA pilot channel.

The CDMA timeout duration may be further used to balance the average current load on the power supply 28. For example, since a typical mobile telephone in a slotted paging environment has about a 10% duty cycle, the CDMA timeout duration may be set such that a 10% duty cycle is maintained during the cycle of pilot searches. That is to say that the ratio of the time that the mobile telephone 10 is searching for a CDMA pilot signal to the time that it spent in another state (i.e. sleep state or AMPS idle state) would be about 10%. Clearly, there are many ways to set the CDMA timeout duration used in block 204, and the present invention is not limited by any specific duration or duration-setting algorithm.

After the expiration of the CDMA timeout, as measured by clock 24, the process proceeds to decision diamond 206 where it is determined whether the dummy variable 'in' is equal to zero. This would be the case in a first iteration of a sequence of searches as will be described below. If 'in' is equal to zero, then a full search, as described above, is executed. In the exemplary embodiment, the full search, although relatively long in duration, is capable of detecting a pilot signal at about −120 dBm. If the full search is determined to be successful (i.e. a CDMA pilot signal has been acquired) at decision diamond 220, then the process of the present invention "ends" at block 222. As previously mentioned, the acquired and demodulated pilot signal provides information used by mobile telephone 10 to acquire and demodulate additional channels required for communication. However, for the purposes of the present invention, it will not be necessary to describe those actions herein, and thus the process of the present invention is said to "end" at block 222.

If the full search does not result in acquisition as determined at decision diamond 220, then the dummy variable 'n' is incremented at block 218, and compared to a maximum number of iterations at decision diamond 224. If the dummy variable 'n' is equal to the maximum number of iterations, then the dummy variable 'n' would be re-initialized to zero at block 202 and the process would start over. However, if the dummy variable 'n' has not yet reached the maximum number of iterations, then the process returns to block 204 where the system again waits for a CDMA timeout.

In this subsequent iteration, upon the expiration of the CDMA timeout in block 204, the process would proceed through decision diamond 206 (because n would not equal zero) to decision diamond 210. If it is determined that 'n is odd (as it would be in a second iteration with n equal to one) then a "mini" search is performed in block 212. A "mini" search is shorter in duration than a full search. Specifically, a "mini" search differs from a full search in that only the first stage of the full search is performed in a mini search. In other words, during a "mini" search, if all searches of a given window size, number of coherent accumulations, and thresholds fail to result in successful acquisition, the pilot search is merely discontinued, rather than proceeding to a second stage with new search parameters.

Thus, if the "mini" search of block 212 does not result in acquisition of the CDMA pilot signal as determined at decision diamond 220, then the dummy variable 'n' is incremented in block 218 and compared with a maximum number of iterations in decision diamond 224 as previously discussed, and the process returns to block 204 to await the next CDMA timeout. In an exemplary embodiment, the "mini" search may take about three seconds, and be able to detect and acquire a CDMA pilot signal at about −110 dBm.

If the dummy variable 'n' is not odd as determined in decision diamond 210 (as would be the case in a third iteration with 'n' equal to two), then the system executes a "micro" search in block 214. A "micro" search is shorter in duration than either the full or mini searches as described above. In the "micro" search of block 214, power detector 62 (FIG. 2) measures the absolute power at the pilot signal frequency as received by receiver 44. This power measurement may take place either at radio frequency (RF) or intermediate frequency (IF). If the absolute power exceeds a given threshold of X dB as determined in decision diamond 216, then the system proceeds to block 212 to continue searching using a mini search. The threshold X dB may be set as a tradeoff between sensitivity and search time, and in the preferred embodiment is about −95 dBm.

However, if the absolute power does not exceed X dB then it is very likely that there is not a CDMA pilot signal present, and so the system merely increments the dummy variable 'n' at block 218, compares it with the maximum number of iterations in block 224, and continues without executing any further search until the next CDMA timeout. In an exemplary embodiment, the "micro" search may take on the order of a few microseconds. Thus, the "micro" search serves to quickly determine whether any further searching (i.e. a mini search) would be immediately desirable, or whether the system should wait for the next CDMA timeout to resume searching.

In the presently preferred embodiment, the maximum number of iterations is five. Thus, assuming that none of the searches was successful in acquiring the pilot signal, the system would execute the following sequence of searches: full, mini, micro, mini, micro, and then repeat the sequence.

The present invention may be used in many applications where a CDMA pilot signal is acquired. For example, it may be used in a dual-mode CDMA/AMPS communication device when communication service is currently available in the AMPS communication system, but the preferred mode of communication is in the CDMA mode. This would be the case, for example, where the dual-mode communication device is within the coverage area of an AMPS base station, but may not presently be within the coverage area of a CDMA base station (i.e. the communication device may be traveling through an area of good AMPS coverage and poor CDMA coverage).

In this example, the dual-mode communication device, such as mobile telephone 10 (FIG. 1), would already be registered with an AMPS base station, such as base station 12 and typically be in an idle state monitoring the AMPS paging channel for incoming pages. According to the method of the present invention, as illustrated in FIG. 3, the mobile telephone 10 would remain in the idle state for a predetermined period, awaiting a CDMA timeout, as previously discussed with respect to block 204. Upon expiration of the CDMA timeout, the mobile telephone 10 would then execute the method of the present invention as previously disclosed.

Assuming that a full search would take fifteen seconds per CDMA channel, and that a mini search would take three seconds per CDMA channel, and that a micro search would take a few microseconds, an unsuccessful sequence of five searches (i.e. full, mini, micro, mini, micro) would take about thirty-six seconds of search time. Thus, if the CDMA timeout duration in this example were set to about three minutes, the mobile telephone 10 would spend about fifteen minutes in AMPS idle mode, and only about thirty-six seconds in CDMA pilot search mode. As a result, the mobile telephone 10 would statistically only be expected to miss about four percent of the AMPS pages (assuming a single transceiver), and yet still be able to quickly and reliably be able to acquire the CDMA signal when it became available. This balance of search time versus AMPS idle time would be advantageous for the mobile telephone 10 user because he or she would be able to reliably make or receive a call in AMPS mode, and yet still obtain the improved quality of CDMA service when it became available.

It should be noted that the above example is merely exemplary of the invention, and that longer or shorter search times and CDMA timeout durations may be used in order to tailor the present invention to different operating environments. Additionally, the present invention may be used at any time that a wireless communication device attempts to acquire a CDMA pilot signal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for acquiring, in a wireless communication device, a code division multiple access (CDMA) pilot signal having a pilot pseudonoise (PN) code offset, said wireless communication device receiving a signal, said method comprising the steps of:

(a) correlating said received signal with a first set of PN code offset hypotheses to produce a first set of correlation metrics;

(b) analyzing said first set of correlation metrics to determine whether one of said first set of PN code offset hypotheses matches said pilot PN code offset;

(c) waiting for a first period if said pilot PN code offset does not match one of said first set of PN code offset hypotheses;

(d) correlating said received signal with a second set of PN code offset hypotheses after step (c) to produce a second set of correlation metrics, said second set of PN code offset hypotheses being a subset of said first set of PN code offset hypotheses; and (e) analyzing said second set of correlation metrics to determine whether one of said second set of PN code offset hypotheses matches said pilot PN code offset.

2. The method of claim 1 further comprising the steps of:

(f) waiting for a second period if said pilot PN code offset does not match one of said second set of PN code offset hypotheses;

(g) measuring the energy of said received signal after step (f) to produce a received energy metric;

(h) comparing said received energy metric to a received energy threshold; and (i) repeating steps (d)–(e) if said received energy metric exceeds said received energy threshold.

3. The method of claim 2 further comprising:

(j) defining a maximum number of iterations; and (k) repeating steps (a)–(i) for said maximum number of iterations.

4. The method of claim 3 wherein said wireless communication device has a CDMA mode and an analog mode, said wireless communication device operating in a wireless communication environment having at least one CDMA base station which transmits said CDMA pilot signal, and at least one analog base station which transmits an analog pilot signal, said method further comprising the steps of:

(l) acquiring said analog pilot signal; and (m) performing steps (a)–(k) after step (l).

5. An system for acquiring, in a wireless communication device, a code division multiple access (CDMA) pilot signal having a pilot pseudonoise (PN) code offset, said wireless communication device receiving a signal, said system comprising:

a demodulator for demodulating said received signal with a first set of PN code offset hypotheses to produce a first set of correlation metrics;

a threshold comparer for analyzing said first set of correlation metrics to determine whether one of said first set of PN code offset hypotheses matches said pilot PN code offset;

a clock for waiting for a first period if said pilot PN code offset does not match one of said first set of PN code offset hypotheses;

wherein said demodulator is further for demodulating said received signal with a second set of PN code offset hypotheses to produce a second set of correlation metrics, said second set of PN code offset hypotheses being a subset of said first set of PN code offset hypotheses; and wherein said threshold comparer is further for analyzing said second set of correlation metrics to determine whether one of said second set of PN code offset hypotheses matches said pilot PN code offset.

6. The system of claim 5 wherein said clock is further for waiting for a second period if said pilot PN code offset does not match one of said second set of PN code offset hypotheses, said apparatus further comprising a power detector for measuring the energy of said received signal to produce a received energy metric, and for comparing said received energy metric to a received energy threshold.

* * * * *